United States Patent
Mantena et al.

(10) Patent No.: US 6,999,949 B2
(45) Date of Patent: Feb. 14, 2006

(54) METHOD, SYSTEM AND PROGRAM PRODUCT FOR PROVIDING AN ELECTRONIC ORDER CONFIRMATION IN AN ELECTRONIC TRANSACTION

(75) Inventors: Ravindra R. Mantena, Morrisville, NC (US); Christina L. Mattoon, Danbury, CT (US); Bijay Satpathy, Danbury, CT (US); Julie A. Wheeler-Cyran, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 09/751,078

(22) Filed: Dec. 29, 2000

(65) Prior Publication Data

US 2002/0087477 A1  Jul. 4, 2002

(51) Int. Cl.
G06F 17/60 (2006.01)

(52) U.S. Cl. ............... 705/400; 705/80; 705/1; 705/64; 705/50; 705/14

(58) Field of Classification Search ............... 705/64, 705/80, 37, 26, 1, 400, 14, 50, 20
See application file for complete search history.

(56) References Cited

U.S. PATENT DOCUMENTS

| | | | |
|---|---|---|---|
| 6,249,772 B1 * | 6/2001 | Walker et al. | 705/26 |
| 6,286,028 B1 | 9/2001 | Cohen et al. | 709/202 |
| 6,338,050 B1 | 1/2002 | Conklin et al. | 705/80 |
| 6,381,640 B1 | 4/2002 | Beck et al. | 709/223 |
| 6,415,156 B1 * | 7/2002 | Stadelmann | 455/466 |
| 6,418,448 B1 * | 7/2002 | Sarkar | 707/104.1 |
| 2002/0016726 A1 * | 2/2002 | Ross | 705/7 |
| 2002/0038255 A1 * | 3/2002 | Tarvydas et al. | 705/26 |

FOREIGN PATENT DOCUMENTS

WO  WO 00/42552  * 7/2000

OTHER PUBLICATIONS

Busse, Torsten, "Boeing Takes off with Baan", Jul. 6, 1998, InfoWorld v20 n27 p65(2) ☐☐(Dialog file 256, Accession No. 00109318).*

(Continued)

*Primary Examiner*—Firmin Bauker
*Assistant Examiner*—Jalatee Worjloh
(74) *Attorney, Agent, or Firm*—Wayne F. Reinke, Esq.; Heslin Rothenberg Farley & Mesiti P.C.

(57) ABSTRACT

An electronic order confirmation for a made-to-order or out-of-stock item in an electronic transaction is provided to a public electronic environment (e.g., a browser on a global computer network) from a private electronic environment (e.g., an ERP application on a private computer network) by electronically receiving a sales order in a private electronic environment from a purchaser in a public electronic environment; obtaining an electronic including an entitled price and an estimated date of delivery for the item, within the private electronic environment while the purchaser waits; and automatically returning an electronic order confirmation, including the entitled price and the estimated date of delivery, from the private electronic environment to the public electronic environment for providing to the purchaser.

48 Claims, 1 Drawing Sheet

OTHER PUBLICATIONS

"Vetcentric.com Web Enables Veterianry Suply Chain Using Neon Technology", PR NEwswire, Jul. 13, 2000 (Dialog file 613, Accession No. 00373116).*

"Candle and AT&T Team up at SAPPHIRE Conference to Demonstrate ANy-to-Any Application Integration for SAP R/3 Applications via the Web or Lotus Notes".*

"Minolta-QMS Extends E-commerce Activities with Worldwide SAP Implementation", Jun. 12, 2000, Business Wire.*

U.S. Appl. No. 60/210,987.*

Carter, et al., "Supplier Bar Codes: Closing The EDI Loop," National Association of Purchasing Management, Aug. 1991.

* cited by examiner

METHOD, SYSTEM AND PROGRAM PRODUCT FOR PROVIDING AN ELECTRONIC ORDER CONFIRMATION IN AN ELECTRONIC TRANSACTION

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

Patent application Ser. No. 09/752,330, filed on Dec. 29, 2000, by Mantena et al., entitled "Method, System and Program Product for Providing an Entitled Price in an Electronic Transaction";

Patent application Ser. No. 09/752,331, filed on Dec. 29, 2000, by Mantena et al., entitled "Method, System and Program Product for Providing an Estimated Date of Delivery in an Electronic Transaction";

Patent application Ser. No. 09/751,069, filed on Dec. 29, 2000, by Mantena et al., entitled "Method, System and Program Product for Synchronous Communication Between a Public Electronic Environment and a Private Electronic Environment".

BACKGROUND OF THE INVENTION

1. Technical Field

The present invention generally relates to providing an electronic order confirmation in an electronic transaction. More particularly, the present invention relates to providing an electronic order confirmation comprising an entitled price and an estimated date of delivery from a private electronic environment to a public electronic environment.

2. Background Information

Electronic transactions involving the purchase of various goods and services have steadily increased with the popularity and use of public electronic environments, such as, for example, global computer networks (e.g., the INTERNET). Among the biggest participants in such electronic transactions for goods are large businesses that typically make volume purchases. These types of companies tend to negotiate price discounts with one or more sellers of goods they need. Such negotiated prices are referred to herein as the "entitled price," which is the price a buyer is entitled to for a given item based on an entitlement, such as, for example, a contract with the seller or a promotional offer from the seller (e.g., a coupon) or a program with a business partner of the seller (e.g., "point" programs similar to airline mileage programs).

Due to the number of and differences among the various entitlements for various customers of a given electronic merchant, the calculation of an entitled price is no trivial matter, let alone doing so while the customer waits. Also, where made-to-order and out-of-stock items are desired, it has proven to be problematic for electronic merchants to identify with any degree of certainty a date of delivery for the goods while the buyer is still in the shopping session, without resorting to chaotic behind-the-scenes manual intervention. The information needed to calculate the entitled price and the estimated date of delivery, among other things, typically resides in a private electronic environment, such as, for example, a secure computer or computer network housing an Enterprise Resource Planning (ERP) application.

ERP applications are large, expensive and complex computer programs that track massive volumes of data (e.g., base prices, customers, contracts, inventory levels, manufacturing schedules, delivery schedules, price rules, tax conditions, etc.), and calculate, among other things, an entitled price and/or an estimated date of delivery. Due to the sensitive nature of such information, both for the buyer and the seller, ERP applications have not been made accessible from public electronic environments for security reasons.

It has been suggested that commerce sites simply develop their pricing engines to provide an entitled price and/or an estimated date of delivery. However, since the key data resides with the ERP application, such engines would require that the data be kept current in more than one location. Such a situation could result in a price and/or delivery date provided to the buyer that is different from the price/delivery date ultimately returned, for example, if a base price update has not yet been made for the engine. Worse, for example, some commerce sites will actually go offline to calculate the entitled price and send it back to buyer, making it appear to the buyer to be automatically generated. This practice, known as "rip and read" can also lead to inaccuracies, due to time constraints and human error. Such confusion causes various problems for the large buyers, not the least of which are budgeting and scheduling deployment of new equipment, and serves only to reduce the credibility of the electronic merchant.

Thus, a need exists for a way to provide an electronic confirmation of an order, including an accurate entitled price and a reliable estimated date of delivery, in an electronic transaction.

SUMMARY OF THE INVENTION

Briefly, the present invention satisfies the need for an electronic order confirmation in an electronic transaction by providing a secure communication link between a public electronic environment and a private electronic environment for receiving the sales order, obtaining the electronic order confirmation, and returning the same to the buyer while the buyer waits (i.e., in real time).

In accordance with the above, it is an object of the present invention to provide an electronic order confirmation in an electronic transaction.

The present invention provides, in a first aspect, a method of providing an electronic order confirmation in an electronic transaction. The method comprises electronically receiving a sales order in a private electronic environment from a purchaser in a public electronic environment, obtaining an entitled price and an estimated date of delivery, within the private electronic environment while the purchaser waits, and automatically returning an electronic order confirmation from the private electronic environment to the public electronic environment for providing to the purchaser. The electronic order confirmation comprises the entitled price and the estimated date of delivery.

The present invention also provides a system and program product in second and third aspects, respectively, implementing the method of the first aspect of the invention.

These, and other objects, features and advantages of this invention will become apparent from the following detailed description of the various aspects of the invention taken in conjunction with the accompanying drawings.

DETAILED DESCRIPTION OF THE INVENTION

Figure 1:
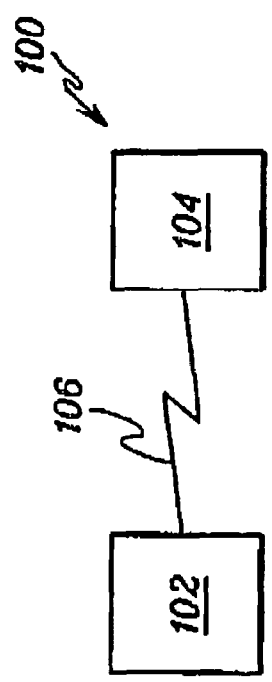
FIG. 1 is a simplified block diagram of a computing environment useful with the present invention.

One example of a computing environment useful with the present invention is described with reference to FIG. 1. A computing environment 100 includes, for instance, at least one computing unit 102 coupled to at least one other computing unit 104. In one example, computing unit 102 is a buyer's computer, while computing unit 104 is a server for an electronic merchant. Each unit includes, for example, one or more central processing units, memory, one or more storage devices and one or more input/output devices, as is well known in the art.

Computing unit 104 is, for example, an IBM system running AIX, a Unix derivative Operating System, and computing unit 102 is, for instance, a personal computer, such as a personal computer with Microsoft WINDOWS as the operating system, and based on the Intel PC architecture.

Computing unit 102 is coupled to computing unit 104 via a standard connection 106, such as any type of wire connection, token ring or network connection, to name just a few examples. One example of a communications protocol used by one or more of these connections is TCP/IP which allows connection to a computer network, such as, for example, a local area network or a global computer network (e.g., the INTERNET).

The INTERNET comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a user's computer system specifies the URL for that Web page in a request (e.g., a HyperText Transfer Protocol ("HTTP") request). The request can be, for example, directly input or performed through a hyperlink (or just "link") which is text or graphics that when pointed to and selected creates the request. The request is forwarded to the Web server that supports that Web page. When that Web server receives the request, it sends that Web page to the user's computer system. When the user's computer system receives that Web page, it typically displays the Web page using a browser. A browser is a special-purpose application program that effects the requesting of Web pages and the displaying of Web pages. A user's computer system may use a browser such as, for example, Microsoft INTERNET EXPLORER or Netscape NAVIGATOR.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the user's computer system an HTML document that defines the Web page. When the requested HTML document is received by the user's computer system, the browser displays the Web page as defined by the HTML document. The HTML document contains various tags that control the displaying of text, graphics, controls, and other features. The HTML document may additionally contain URLs of other Web pages available on that server computer system or other server computer systems.

Figure 2:
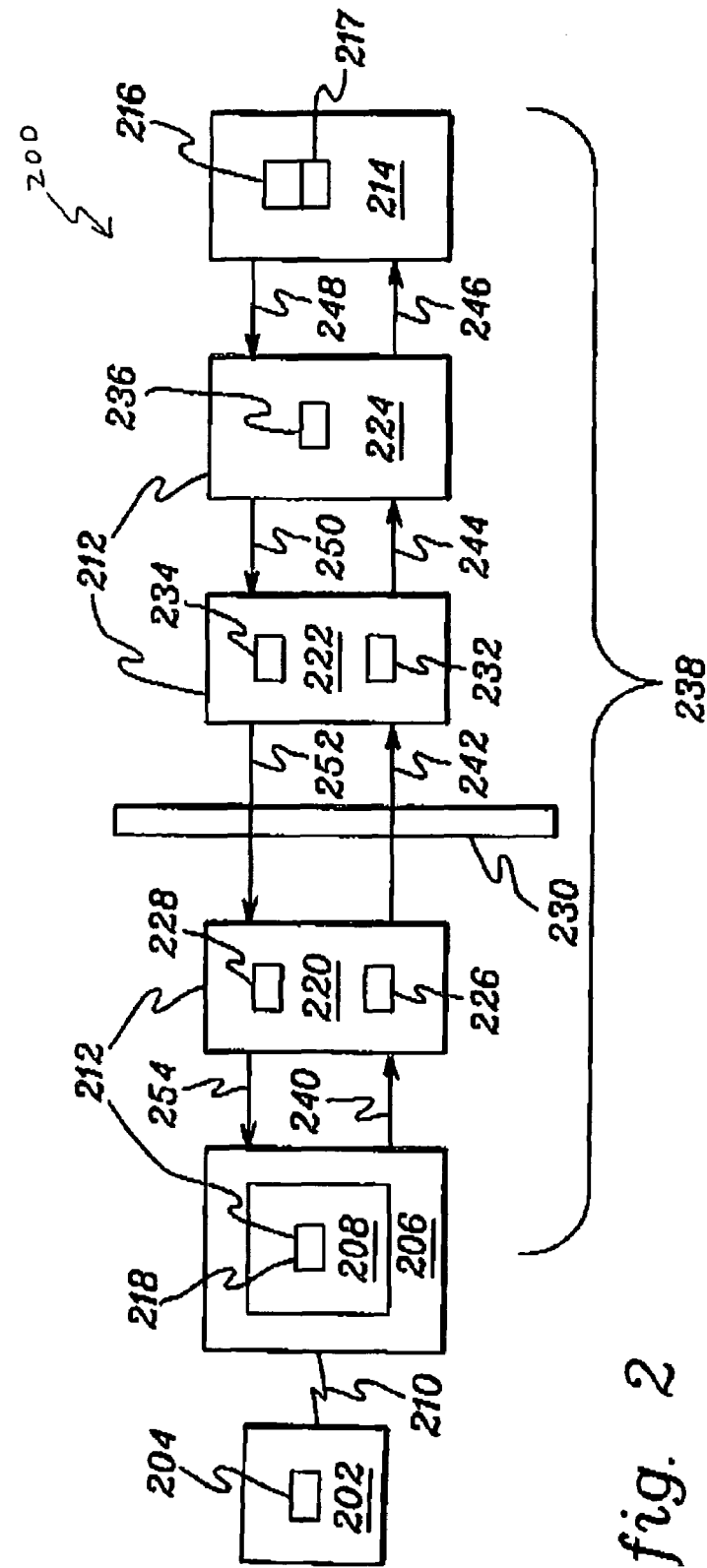
FIG. 2 is a block diagram of a system for providing an electronic order confirmation in an electronic transaction.

FIG. 2 is a block diagram of one example of a system 200 for providing an electronic order confirmation in an electronic transaction to a public electronic environment, e.g., a front end application on a global computer network, from a private electronic environment, e.g., a back end ERP application on a private computer network. The electronic order confirmation comprises an entitled price and an estimated date of delivery. System 200 comprises computing unit 202 housing a browser 204 coupled to a server 206 for a commerce site 208 via a global computer network 210. System 200 further comprises messaging middleware 212 for communication between server 206 and computing unit 214 housing back end ERP application 216. The ERP application includes a database 217 of entitled price information, inventory, manufacturing capacity, and shipping information, among other information.

Messaging middleware 212 could be, for example, MSMQ from Microsoft in Redmond, Wash. However, the messaging middleware is preferably MQSERIES from IBM in Armonk, N.Y., since it runs on multiple different operating systems (e.g., MVS, VM, AIX, UNIX, Windows and more), whereas MSMQ runs only on the Microsoft Windows operating system. Further, the ERP application could be, for example, BAAN from the BAAN Company in The Netherlands, however, the ERP application is preferably SAP from SAP AG in Germany. Most preferably, the combination of MQSERIES and SAP is used.

The messaging middleware in this example is broken up into several components, including first messaging client 218, first messaging server 220, second messaging server 222 and second messaging client 224. First messaging client 218 is actually part of the programming for commerce site 208, and initiates communications from browser 204 to the messaging middleware. First messaging server 220 is a computing unit, and comprises a transmission queue 226 for outgoing communications with second messaging server 222 (also a computing unit), and a local queue 228 for incoming communications from second messaging server 222.

A firewall 230 separates the messaging servers. As one skilled in the art will know, a firewall physically comprises equipment and/or software for monitoring all incoming communications to messaging server 222 (and, in some scenarios, outgoing communications as well) for messages coming from predefined addresses (e.g., Internet Protocol (IP) addresses), and only allows messages from those addresses through. In addition, a firewall can monitor the type of incoming message (e.g., a request for a particular type of information). Second messaging server 222 comprises a holding queue 232 for holding incoming communications from messaging server 220, and a reply queue 234 for outgoing messages to messaging server 220. Second messaging client 224 comprises module 236 for issuing commands to ERP application 216 to calculate an entitled price and an estimated date of delivery. In one scenario, the second messaging client is a separate computing unit, however, it could instead be part of the same computing unit, for example, messaging server 222 or even computing unit 214.

It will be understood that the calculation of the entitled price and the calculation of the estimated date of delivery are not part of the present invention. The invention simply requires the results, however, the way the results are produced is not relevant. In actual implementation, it is the ERP application that calculates the entitled price and the estimated date of delivery in any number of different ways, and that is how this example will describe the obtaining of those results.

In the present example, the messaging middleware (except, technically, for messaging client 218), firewall and ERP application all reside on a private computer network 238 (e.g., a local area network) while browser 204 and server 206 are part of global computer network 210, which is a public computer network. Server 206 can be considered to sit on both networks, connected to browser 204 through the global computer network, and to the other elements of private network 238 via messaging client 218. One example of a communications protocol on private network 238 is TCP/IP.

One example of providing an electronic order confirmation to a user employing browser 204 from ERP application 216 will now be described. In this example, the user initiates the communication by placing an order for a particular made-to-order or out-of-stock item via browser 204 to commerce site 208 via global computer network 210. This could be done, for example, by selecting (using, e.g., a pointing device) a graphical button on the site near a graphic of the item and, typically, going through some sort of check-out process. Assume that the buyer is an employee buying for his employer, a large company having a contract with the merchant of the commerce site. The contract calls for a discount on the base price for the particular item of 15%.

In some manner, it will be necessary for the employee to be identified as a buyer for the company. In addition, ERP applications will typically require other information, such as, for example, a location for shipment, a requested arrival date and the date of ordering (to check against the term of any entitlement contract that may apply). This could be done, for example, by the employee providing the information, for instance, along with the order. The identifying information could, for example, take the form of the employee's name, which could be kept in the ERP application and associated with the company or a particular contract. As another example, the identifying information could take the form of simply the name of the employer. As still another example, a small identifying program known as a "cookie" could be stored on computing unit 202 that would automatically provide the identifying information, along with a previous location for shipping that could be changed if necessary. However, in any case, if the employer has multiple contracts and/or the employee is a buyer on multiple contracts, then additional clarifying information will be needed, for example, a contract number.

After placing the order, the browser (and employee) then waits for the electronic order confirmation to be returned from ERP application 216 by commerce site 208. Upon receipt of the order by site 208 via server 206, messaging client 218 connects to messaging server 220 over standard connection 240. A connection is made, for example, via an application program interface (API), with messaging client 218 being preprogrammed with an address for messaging server 220. Once the connection is established, the messaging client then sends the order to the messaging server along with an identification of second messaging server 222 and, preferably, a unique token identifier to track the message path. The connection between messaging client 218 and messaging server 220 remains open, awaiting a reply. Also, preferably, the identification for second messaging server 222 is not the real address thereof, but something that can be correlated by first messaging server 220 into a real address. This masking of the real address is for security, since global computer network server 206 is exposed to a public computer network. Once the order along with any other necessary order processing information, collectively "the order" and the token identifier are received by messaging server 220, they are placed in transmission queue 226. The transmission queue is not intended to hold a request for any length of time, but simply acts as a temporary staging queue.

Once placed in transmission queue 226, the order and the token identifier are immediately transmitted over an open channel 242 across firewall 230 to messaging server 222. Once received by messaging server 222, the order and the token identifier are placed in holding queue 232. Open channel 242 is actually a standard connection monitored and controlled by channel software residing on messaging server 222.

When the order and the token identifier are placed in holding queue 232, module 236 is, in some fashion, woken up. In one example, second messaging client 224 constantly monitors holding queue 232, and once something is placed therein, immediately retrieves the same. In any case, the order and token identifier are passed from messaging server 222 to messaging client 224 via standard connection 244. Depending on the messaging middleware used, module 236 may need to reformat the information being passed to match a format required by the particular ERP application being used. The function of module 236 is, however, to issue one or more commands to ERP application 216 over standard connection 246 to, among other things, calculate the entitled price and calculate the estimated date of delivery. It will be understood that in practice, module 236 could actually be multiple modules, one for each command, for example. After issuing the command(s) to the ERP application, messaging client 224, like the elements back to browser 204, waits for a confirmation of the order from the ERP application.

In response to the command(s), ERP application 216 receives the order and the token identifier, accesses database 217 and calculates an entitled price and an estimated date of delivery. With regard to the entitled price, the ERP application accesses database 217 to determine what the requestor is entitled to, in terms of a discount. The ERP application also looks up the list price for the item indicated in the request, and applies the discount percentage to the list price to determine the entitled price. The ERP application may also calculate any taxes that would be applied to the purchase, based on tax tables stored and regularly updated in its database. Preferably, a quantity of the item is included in the request, in which case the ERP application would multiply the entitled price by the quantity, as well as the total amount of taxes, if applicable.

After the ERP application calculates the entitled price and the estimated date of delivery, it returns the electronic order confirmation and the token identifier to messaging client 224 over standard connection 248. The order confirmation may contain other information besides an entitled price and an estimated date of delivery, for example, an order confirmation number. Upon receipt of the confirmation, messaging client 224 immediately transfers the confirmation and token identifier to messaging server 222 over standard connection 250. Messaging server 222, upon receipt of the information, immediately places it in reply queue 234. Reply queue 234 points to messaging server 220 and, since there is an open channel 252 between the messaging servers, the confirmation and token identifier are immediately transferred from reply queue 234 to messaging server 220. Open channel 252 is, like open channel 242, a standard connection monitored and controlled by software residing on messaging server 220, and once something is placed in entitled price queue 234, it immediately transfers the contents thereof to messaging server 220. Messaging server 220 then places the confirmation and the token identifier in local queue 228. Once messaging client 218 detects that something has been placed in local queue 228, it retrieves the confirmation and token identifier over standard connection 254, and confirms that the token identifier received matches the one that was originally sent. At this point, commerce site 208 returns the electronic order confirmation to browser 204 for display thereby (and viewing and/or printing and/or storing by the purchaser) over global computer network 210.

Although system 200 was described with two messaging server/client pairs, it will be understood that more or less such pairs could be used, and that a given pair need not be on separate computing units. For example, there could be another messaging server/client pair within computing unit 214. Additional messaging server/client pairs provide increased security, which could further be enhanced with additional firewalls. Further, it will be understood that the connection pairs between elements on private computer network 238 could each actually be a single, standard two-way connection.

Security for system 200 is also preferably enhanced through the use of encryption at various stages. For example, communications between computing unit 202 and server 206 are preferably encrypted. One example of such encryption is 128-bit SSL (secure socket layer) encryption, which is routinely used on global computer networks. In such a case, for example, communications from computing unit 202 to server 206 are encrypted by browser 204, and decrypted by commerce site 208. Further, as a communication is received by messaging server 220 over connection 240, it is again encrypted. Examples of encryption algorithms that could be used include, for instance, DES and TRIPLE-DES available in various commercially available products from International Business Machines Corporation in Armonk, N.Y. Messaging server 222 then decrypts the communication via channel 242 upon receipt. When a reply is coming back from ERP application 216, it is encrypted as it leaves messaging server 222 and decrypted as it leaves messaging server 220. In this case, since connection 254 is not a channel, the decryption is actually done by messaging server 220. It will be understood that the above encryption scheme is merely one example of numerous encryption schemes that could be used.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to servers and clients, such embodiments are only examples. Other types of computing environments can benefit from the present invention and, thus, are considered a part of the present invention.

Additionally, in various aspects of the present invention, the client need not be remote from the server. Various aspects of the invention are equally applicable to clients and servers running on the same physical machine, different physical machines or any combinations thereof.

The present invention can include at least one program storage device readable by a machine, tangibly embodying at least one program of instructions executable by the machine to perform the capabilities of the present invention. The program storage device can be provided separately, or as a part of a computer system.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of providing an electronic order confirmation in an electronic transaction, comprising:
    electronically receiving a sales order in a private electronic environment from a purchaser in a public electronic environment, wherein the public electronic environment comprises a front end application, wherein the private electronic environment comprises a back end Enterprise Resource Planning (ERP) application, and wherein the electronically receiving comprises electronically receiving by the back end ERP application the sales order from the front end application;
    obtaining an entitled price and an estimated date of delivery, within the private electronic environment while the purchaser waits, wherein the obtaining comprises obtaining the entitled price and the estimated date of delivery from the back end ERP application, and wherein the entitled price comprises a price the purchaser is entitled to based on an entitlement; and
    automatically returning an electronic order confirmation from the private electronic environment to the public electronic environment for providing to the purchaser, wherein the automatically returning comprises automatically returning the electronic order confirmation from the back end ERP application to the front end application, and wherein the electronic order confirmation comprises the entitled price and the estimated date of delivery.

2. The method of claim 1, wherein the electronically receiving comprises electronically receiving the sales order by the ERP application from messaging middleware.

3. The method of claim 2, further comprising electronically sending a command to the ERP application from the messaging middleware.

4. The method of claim 2, wherein the messaging middleware comprises MQSERIES and the ERP application comprises SAP.

5. The method of claim 2, wherein the messaging middleware comprises MQSERIES.

6. The method of claim 2, wherein the messaging middleware comprises MSMQ.

7. The method of claim 1, wherein the ERP application comprises SAP.

8. The method of claim 1, wherein the ERP application comprises BAAN.

9. The method of claim 1, wherein the front end application comprises a browser.

10. The method of claim 9, wherein the public electronic environment comprises a global computer network.

11. The method of claim 10, wherein the electronically receiving comprises electronically receiving by the ERP application the sales order from messaging middleware, and wherein the automatically returning comprises:
sending the electronic order confirmation from the ERP application to the messaging middleware;
forwarding the electronic order confirmation from the messaging middleware to a global computer network site server on the global computer network; and
returning the electronic order confirmation from the global computer network site server to the browser.

12. The method of claim 11, further comprising encrypting and decrypting the electronic order confirmation between the browser and the global computer network site server.

13. A system for providing an electronic order confirmation in an electronic transaction, comprising:
means for electronically receiving a sales order in a private electronic environment from a purchaser in a public electronic environment, wherein the public electronic environment comprises a front end application, wherein the private electronic environment comprises a back end Enterprise Resource Planning (ERP) application, and wherein the means for electronically receiving comprises means for electronically receiving by the back end ERP application the sales order from the front end application;
means for obtaining an entitled price and an estimated date of delivery, within the private electronic environment while the purchaser waits, wherein the means for obtaining comprises the back end ERP application, and wherein the entitled price comprises a price the purchaser is entitled to based on an entitlement; and
means for automatically returning an electronic order confirmation from the private electronic environment to the public electronic environment for providing to the purchaser, wherein the means for automatically returning comprises means for automatically returning the electronic order confirmation from the back end ERP application to the front end application, and wherein the electronic order confirmation comprises the entitled price and the estimated date of delivery.

14. The system of claim 13, wherein the means for electronically receiving comprises means for electronically receiving the sales order by the ERP application from messaging middleware.

15. The system of claim 14, further comprising means for electronically sending a command to the ERP application from the messaging middleware.

16. The system of claim 14, wherein the messaging middleware comprises MQSERIES and the ERP application comprises SAP.

17. The system of claim 14, wherein the messaging middleware comprises MQSERIES.

18. The system of claim 14, wherein the messaging middleware comprises MSMQ.

19. The system of claim 13, wherein the ERP application comprises SAP.

20. The system of claim 13, wherein the ERP application comprises BAAN.

21. The system of claim 13, wherein the front end application comprises a browser.

22. The system of claim 21, wherein the public electronic environment comprises a global computer network.

23. The system of claim 22, wherein the means for electronically receiving comprises means for electronically receiving by the ERP application the sales order from messaging middleware, and wherein the means for automatically returning comprises:
means for sending the electronic order confirmation from the ERP application to the messaging middleware;
means for forwarding the electronic order confirmation from the messaging middleware to a global computer network site server on the global computer network; and
means for returning the electronic order confirmation from the global computer network site server to the browser.

24. The system of claim 23, further comprising means for encrypting and decrypting the electronic order confirmation between the browser and the global computer network site server.

25. At least one program storage device readable by a machine, tangibly embodying at least one program of instructions executable by the machine to perform a method of providing an electronic order confirmation in an electronic transaction, comprising:
electronically receiving a sales order in a private electronic environment from a purchaser in a public electronic environment, wherein the public electronic environment comprises a front end application, wherein the private electronic environment comprises a back end Enterprise Resource Planning (ERP) application, and wherein the electronically receiving comprises electronically receiving by the back end ERP application the sales order from the front end application;
obtaining an entitled price and an estimated date of delivery within the private electronic environment while the purchaser waits, wherein the obtaining comprises obtaining the entitled price and the estimated date of delivery from the back end ERP application, and wherein the entitled price comprises a price the purchaser is entitled to based on an entitlement; and
automatically returning an electronic order confirmation from the private electronic environment to the public electronic environment for providing to the purchaser, wherein the automatically returning comprises automatically returning the electronic order confirmation from the back end ERP application to the front end application, and wherein the electronic order confirmation comprises the entitled price and the estimated date of delivery.

26. The at least one program storage device of claim 25, wherein the electronically receiving comprises electronically receiving the sales order by the ERP application from messaging middleware.

27. The at least one program storage device of claim 26, further comprising electronically sending a command to the ERP application from the messaging middleware.

28. The at least one program storage device of claim 26, wherein the messaging middleware comprises MQSERIES and the ERP application comprises SAP.

29. The at least one program storage device of claim 26, wherein the messaging middleware comprises MQSERIES.

30. The at least one program storage device of claim 26, wherein the messaging middleware comprises MSMQ.

31. The at least one program storage device of claim 25, wherein the ERP application comprises SAP.

32. The at least one program storage device of claim 25, wherein the ERP application comprises BAAN.

33. The at least one program storage device of claim 25, wherein the front end application comprises a browser.

34. The at least one program storage device of claim 33, wherein the public electronic environment comprises a global computer network.

35. The at least one program storage device of claim 34, wherein the electronically receiving comprises electronically receiving by the ERP application the sales order from messaging middleware, and wherein the automatically returning comprises:

sending the electronic order confirmation from the ERP application to the messaging middleware;

forwarding the electronic order confirmation from the messaging middleware to a global computer network site server on the global computer network; and returning the electronic order confirmation from the global computer network site server to the browser.

36. The at least one program storage device of claim 35, further comprising encrypting and decrypting the electronic order confirmation between the browser and the global computer network site server.

37. A method for providing a computing infrastructure, comprising integrating computer-readable code into a computing system, wherein the computer-readable code in combination with the computing system is capable of performing:

electronically receiving a sales order in a private electronic environment from a purchaser in a public electronic environment, wherein the public electronic environment comprises a front end application, wherein the private electronic environment comprises a back end Enterprise Resource Planning (ERP) application, and wherein the electronically receiving comprises electronically receiving by the back end ERP application the sales order from the front end application;

obtaining an entitled price and an estimated date of delivery, within the private electronic environment while the purchaser waits, wherein the obtaining comprises obtaining the entitled price and the estimated date of delivery from the back end ERP application, and wherein the entitled price comprises a price the purchaser is entitled to based on an entitlement; and automatically returning an electronic order confirmation from the private electronic environment to the public electronic environment for providing to the purchaser, wherein the automatically returning comprises automatically returning the electronic order confirmation from the back end ERP application to the front end application, and wherein the electronic order confirmation comprises the entitled price and the estimated date of delivery.

38. The method of claim 37, wherein the electronically receiving comprises electronically receiving the sales order by the ERP application from messaging middleware.

39. The method of claim 38, further comprising electronically sending a command to the ERP application from the messaging middleware.

40. The method of claim 38, wherein the messaging middleware comprises MQSERIES and the ERP application comprises SAP.

41. The method of claim 38, wherein the messaging middleware comprises MQSERIES.

42. The method of claim 38, wherein the messaging middleware comprises MSMQ.

43. The method of claim 37, wherein the ERP application comprises SAP.

44. The method of claim 37, wherein the ERP application comprises BAAN.

45. The method of claim 37, wherein the front end application comprises a browser.

46. The method of claim 45, wherein the public electronic environment comprises a global computer network.

47. The method of claim 46, wherein the electronically receiving comprises electronically receiving by the ERP application the sales order from messaging middleware, and wherein the automatically returning comprises:

sending the electronic order confirmation from the ERP application to the messaging middleware;

forwarding the electronic order confirmation from the messaging middleware to a global computer network site server on the global computer network; and returning the electronic order confirmation from the global computer network site server to the browser.

48. The method of claim 47, further comprising encrypting and decrypting the electronic order confirmation between the browser and the global computer network site server.

* * * * *

UNITED STATES PATENT AND TRADEMARK OFFICE
CERTIFICATE OF CORRECTION

PATENT NO. : 6,999,949 B2  
DATED : February 14, 2006  
INVENTOR(S) : Mantena et al.

It is certified that error appears in the above-identified patent and that said Letters Patent is hereby corrected as shown below:

<u>Title page,</u>
Item [57], ABSTRACT,
Line 8, delete "an electronic including" after "obtaining".

<u>Column 2,</u>
Lines 59 and 60, delete "The electronic order confirmation comprises the entitled price and the estimated date of delivery.".

Signed and Sealed this

Thirteenth Day of June, 2006

JON W. DUDAS
*Director of the United States Patent and Trademark Office*